April 1, 1958 C. J. GORSICA ET AL 2,828,988
REINFORCED GASKET FOR INTERNAL COMBUSTION
ENGINES OR THE LIKE
Filed Sept. 9, 1955
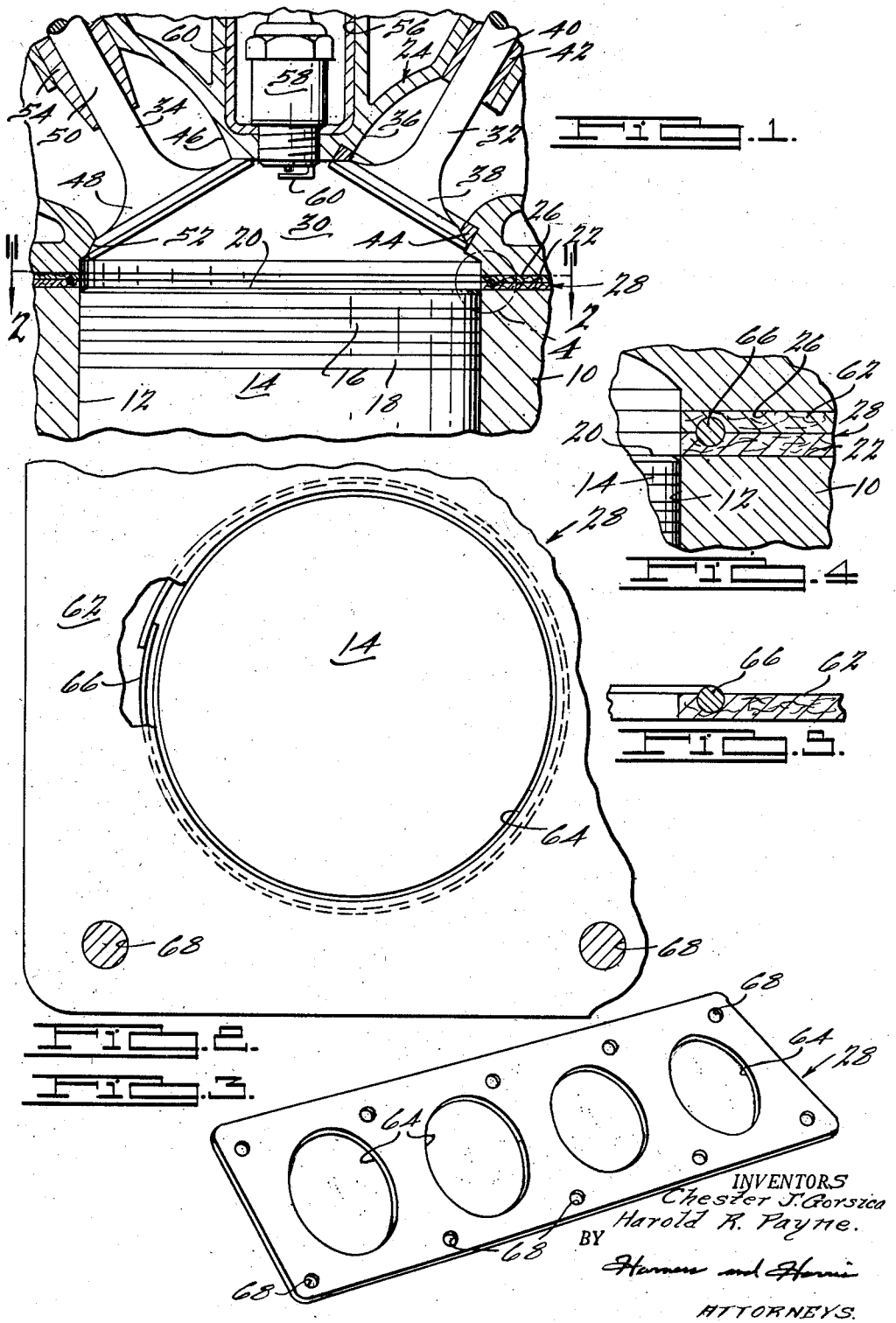
INVENTORS
Chester J. Gorsica
Harold R. Payne.
BY
ATTORNEYS.

United States Patent Office 2,828,988
Patented Apr. 1, 1958

2,828,988

REINFORCED GASKET FOR INTERNAL COMBUSTION ENGINES OR THE LIKE

Chester J. Gorsica, East Detroit, and Harold R. Payne, Royal Oak, Mich., assignors to Chrysler Corporation, Highland Park, Mich., a corporation of Delaware Application September 9, 1955, Serial No. 533,412

4 Claims. (Cl. 288—27)

Our invention relates generally to sealing gaskets and more particularly to an improved silicone asbestos gasket with reinforcing means located at any of several critical areas of the same.

The improved gasket construction of our instant invention finds particular utility as a high pressure sealing gasket for use with internal combustion engines or the like although I contemplate that the principles of our invention may also be applied to gaskets having other adaptations. We also contemplate that the unique reinforcement feature of our improved gasket construction may be applied to gaskets having a variety of compositions although we prefer to use a silicone asbestos material as above indicated.

We are familiar with various types of reinforced gaskets of known construction wherein reinforcing wire mesh or other forms of reinforcing expedients are situated throughout the entire gasket body. However, the gasket construction of our instant invention is unique in that the gasket reinforcing means may be strategically positioned at only those locations where reinforcement is required or where high gasket pressures are desired.

The provision of an improved gasket of the type above described being a principal object of our invention, it is a further object of our invention to provide a reinforced gasket of simplified construction for use with a multiple piece, fluid pressure retaining structure wherein the reinforcing means are formed in the vicinity of the high pressure areas or at any other critical location.

It is a further object of our invention to provide a reinforced gasket as above set forth wherein the reinforcing means is capable of improving the sealing qualities of the same in the vicinity of the high pressure areas or at any other area which requires a completely effective fluid seal.

It is a further object of our invention to provide a fluid pressure sealing gasket in which provision is made for reducing the possibility of failure due to high operating pressure or due to gasket material breakdown.

It is another object of our invention to provide a reinforced gasket adapted to be disposed between the cylinder block and cylinder head of an internal combustion engine or between the juxtaposed surfaces of any other pair of members defining a pressurized fluid chamber wherein the unit pressure exerted by the members on the gasket in the immediate vicinity of the pressurized chamber are greater than the unit pressures at other locations on the gasket.

It is a further object of our invention to provide an improved gasket of the type set forth in the preceding object wherein the unit pressure at any other specified location may be increased relative to an adjacent location as required.

In carrying forth the foregoing objects, we have provided a sealing gasket which, by preference, is comprised of a fibrous material such as silicone asbestos or the like and which is characterized by a reinforcing wire encircling critical areas where reinforcement is required and where an increase in the unit pressures on the gasket are necessary to maintain an effective seal. The reinforcing wire may be of a diameter which is slightly less than the thickness of the gasket when it is in a compressed condition after installation. In the case of a cylinder head gasket for an internal combustion engine, such reinforcing wires may encircle each of the engine cylinder openings where gasket failure is usually initiated.

For the purpose of describing the principal features of a preferred form of our instant invention, reference will be made to the accompanying drawings wherein:

Figure 1 represents a cross sectional view of a cylinder head for an internal combustion engine;

Figure 2 is a plan view of a portion of a gasket capable of being used with the engine cylinder head of Figure 1 and is taken along section line 2—2 of Figure 1;

Figure 3 is a complete three-dimensional representation on a reduced scale of the cylinder head gasket of Figure 2;

Figure 4 is an enlarged sectional view of the portion of the structure in Figure 1 enclosed by the circle identified by numeral 4; and Figure 5 is a view similar to that of Figure 4 showing a sealing gasket having a modified reinforcing means, the engine structure being removed.

Referring first to Figure 1, the engine cylinder block for a conventional internal combustion engine is identified by numeral 10 and it may be formed with any number of engine cylinder bores 12 which are capable of slidably receiving an engine piston 14. The piston 14 may be formed with compression and oil grooves which receive one or more compression rings 16 and one or more oil rings 18. As illustrated in Figure 1, piston 14 is positioned at top dead center and the top surface 20 of the piston 14 substantially corresponds to the top 22 of the engine block 10.

The engine cylinder head is illustrated in part in Figure 1 and is generally designated by numeral 24. The cylinder head 24 is formed with a flat sealing surface 26 and the gasket of our instant invention may be situated between the surface 26 and the juxtaposed surface 22 of the cylinder block 10, said gasket being general designated in Figure 1 by numeral 28. The cylinder head 24 may be secured to the cylinder block 10 by means of bolts in the conventional manner.

The cylinder head 24 is adapted to define a combustion chamber 30 at the upper portion of each of the cylinder bores 12 and an engine exhaust valve and a fuel mixture intake valve of conventional design may be provided in the cylinder head 24 in the vicinity of each combustion chamber 30 as indicated by numerals 32 and 34 respectively. The exhaust valve may be situated within an exhaust opening 36 formed in the engine cylinder head 24 and it may be comprised of a valve head 38 and an integral valve stem 40, the latter extending through a suitable valve guide 42 to an externally situated valve actuator mechanism. The periphery of the valve opening 36 may be formed with an exhaust valve seat 44 against which the periphery of the valve head 38 may seat.

Similarly, the intake valve 34 may be positioned within an intake opening 46 formed in the cylinder head 24 and it may be comprised of a valve head 48 and an integral valve stem 50. The valve head 48 may be seated upon a suitable valve seat 52 defined by the engine cylinder head about the periphery of the intake opening 46 and the valve stem 50 may extend through a valve guide 54 to a suitable externally situated intake valve actuator.

A spark plug well 56 may be formed in the upper portion of the cylinder head 24 intermediate the exhaust and intake valves. A spark plug 58 of conventional design may be threadably received in the bottom of the well 56 with the electrical terminals 60 being exposed to the interior of the combustion chamber 30. A sleeve 60 is positioned within the well 56 and it surrounds the spark plug 58 as shown.

Referring next to Figure 2, the gasket construction 28 of our instant invention is illustrated in more particular detail and it comprises a body portion 62 comprised of silicone asbestos or other suitable fibrous material. A plurality of circular openings 64 are formed in the body 62 for the purpose of providing communication between the cylinder 12 and the associated combustion chamber 30. A wire 66 of either ferrous or non-ferrous material surrounds each of the openings 64 and, according to a preferred embodiment of the invention, it is embedded within the fibrous material of the body portion 62 as best seen in Figure 4. We have found that nickel wire serves this purpose quite satisfactorily although many other materials may also be used with success.

During manufacture the body portions 62 may be formed in laminations and the wire 66 may be embedded within the laminations and enclosed thereby, the diameter of the wire 66 being less than the thickness of the gasket material when the latter is compressed. The ends of the wire 66 may be secured together in abutting relationship to form an endless ring. However, by preference one end of the wire 66 is caused to overlap the other in side-by-side relationship as illustrated in Figure 2.

According to another embodiment, as illustrated in Figure 5, the wire 66 may be placed on one side of the gasket material 62 in surrounding relationship with respect to the opening 64. During assembly the wire 66 may be secured to one side of the material 62 by means of cold bond cement or by means of some other suitable adhesive. After the gasket is assembled and after pressure is applied thereto, the wire 66 will become embedded in the material 62 with a portion thereof extending above the gasket surface.

It will thus be apparent that the unit pressures existing in the immediate vicinity of the wire 66 in each of the above-described embodiments will be considerably greater than the unit pressure existing at adjacent locations in the body material.

In addition to placing the reinforcing wire 66 around each of the cylinder openings 64 a similar reinforcing wire may also be placed about engine coolant passages and bolt openings, the latter being illustrated in Figures 2 and 3 by numeral 68. The magnitude of the pressure exerted at any other reinforced locations may be varied as desired, merely by using a wire of the proper cross sectional dimension.

We contemplate that the principles of our invention as above set forth may also be applied to a metallic type gasket having a copper alloy sheet situated on either side of the asbestos material.

Although we have illustrated certain preferred embodiments of our instant invention, we contemplate that other variations of the same may be made without departing from the scope of the invention as defined by the following claims.

We claim:

1. A reinforced gasket comprising a sheet of compressible gasket material having an opening therein and a reinforcing wire secured to and partially embedded into said material around said opening at one side of said sheet, said wire being exposed at said one side of said sheet and being covered by said material at the opposite side of said sheet.

2. A reinforced gasket comprising a sheet of compressible gasket material having an opening therein and a reinforcing wire secured to and partially embedded into said material around said opening at one side of said sheet, said wire being exposed at said one side of said sheet and being covered by said material at the opposite side of said sheet, and said material covering said wire at said opposite side being more densely compacted than juxtaposed portions of said material.

3. A reinforced gasket comprising a sheet of compressible gasket material having an opening therein and a reinforcing wire secured to and partially embedded into said material around said opening at one side of said sheet, said wire being exposed at said one side of said sheet and projecting beyond the surface thereof at said one side, said wire being covered by said material at the opposite side of said sheet.

4. A sealing gasket adapted to be compressed between juxtaposed sealing surfaces of two parts of comparatively rigid material, said gasket comprising a sheet of compressible gasket material having an opening therein and a reinforcing wire secured to one side of said sheet around said opening, said wire projecting from the surface of said sheet at said one side, thereby to be embedded into said material and to compact the same densely at the region of said wire to effect a seal of high unit pressure against said parts when the latter are clamped against said gasket.

References Cited in the file of this patent

UNITED STATES PATENTS

| | | |
|---|---|---|
| 1,194,408 | Meany | Aug. 15, 1916 |
| 1,819,694 | Sperry | Aug. 18, 1931 |
| 2,021,571 | Victor et al. | Nov. 19, 1935 |

FOREIGN PATENTS

| | | |
|---|---|---|
| 13,097 | Great Britain | 1898 |